Feb. 14, 1967 J. L. FORD ETAL 3,304,368

NOISE LEVEL INDICATOR FOR SCHOOL BUS

Filed May 10, 1963

INVENTORS
JOSEPH L. FORD and
RICHARD L. ROUNDER

BY Lockwood, Woodard, Smith & Weikart
Attorneys 3,304,368
Patented Feb. 14, 1967

3,304,368
NOISE LEVEL INDICATOR FOR SCHOOL BUS

Joseph L. Ford and Richard L. Rounder, both of 640 E. Main St., Brownsburg, Ind. 46112

Filed May 10, 1963, Ser. No. 279,502
4 Claims. (Cl. 179—1)

The present invention relates to a noise control for a school bus.

A familiar sight on suburban roads is a loading school bus surrounded by barking dogs with impatient motorists lined up behind the bus waiting for the loading process to be completed. It can, therefore, be appreciated that the school bus driver is under pressure. Not only does he have the lives of children as his responsibility; he must also work in an environment wherein the noise level frequently rises to the limits of human adult tolerance. Consequently, one object of the present invention is to provide a device for assisting the driver in controlling noise in a school bus.

Still another object of the present invention is to provide a device for controlling noise in a school bus, said device also providing a game for the children while riding in the bus.

A further object of the present invention is to provide a device capable of either indicating to the occupants of a school bus that the noise level within the bus has exceeded a certain level or amplifying the voice of the school bus driver as he talks to the children within the bus.

Related objects and advantages will become apparent as the description proceeds.

One embodiment of the present invention might be used in a passenger bus having a driver seat and a plurality of passenger seats all facing forwardly. The embodiment would further include a noise level indicating system comprising a light mounted in the bus at the forward end thereof and sufficiently high to be visible to all persons sitting in said seats, a microphone mounted in said bus adjacent the top of said driver's seat whereby said microphone is adjacent the ears and mouth of a person sitting in said driver's seat, a loudspeaker mounted within said bus, an implifier coupled to said microphone, and means for alternatively coupling said light and said loudspeaker to said amplifier.

The full nature of the invention will be understood from the accompanying drawings and the following description and claims.

Figure 1:
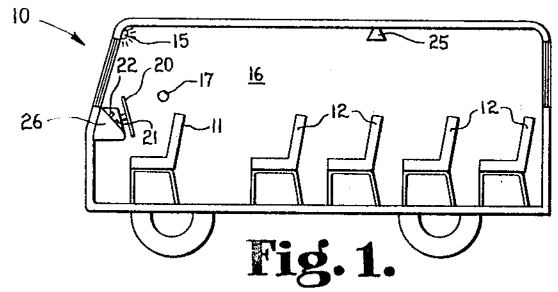
FIG. 1 is a longitudinal section of a school bus incorporating the present invention.

For the purposes of promoting an understanding of the principles of the invention, reference will now be made to the embodiment illustrated in the drawing and specific language will be used to describe the same. It will nevertheless be understood that no limitation of the scope of the invention is thereby intended, such alternations and further modifications in the illustrated device, and such further applications of the principles of the invention as illustrated therein being contemplated as would normally occur to one skilled in the art to which the invention relates.

Referring more particularly to the drawings, there is illustrated a school bus 10 having a driver's seat 11 and a plurality of passenger seats 12. Fixedly mounted within the school bus at the forward end thereof is a light 15 which is preferably red but may be of any desired color. On the side wall 16 of the bus, there is mounted a microphone 17. The microphone 17 is coupled by suitable electrical apparatus described below to the light 15 so that when sound or noise reaches the microphone 17 and actuates it, the light 15 is turned on.

It will be noted that the light 15 is high up where it is visible to all sitting in the passenger seats 12 and to the driver sitting in the seat 11. The microphone 17 is located adjacent the ears and mouth of the driver. Thus, when the driver is facing forwardly and controlling the bus by means of the steering wheel 20, his ear is just adjacent the microphone 17 and the noise heard by the driver is the same amount or intensity of noise that is received by the microphone. Mounted upon the dashboard 21 of the bus is a control 22. This control can be actuated manually by the driver to set the intensity at which the light 15 is lit. Thus, on some days when the driver is better able to withstand a high noise level, the control 22 can be set to a relatively high value while on other days, the control can be set to a lower value.

The manner of operation of the device should be relatively clear from the above explanation. The driver informs the students that the object is to prevent the light 15 from being lit. Whenever the light 15 is lit, then the occupants of the bus know that the noise level has risen above the allowed amount.

In the illustrated embodiment of FIG. 1 there is additionally supplied a loudspeaker 25 which is coupled to the microphone 17. A suitable switch 26 is provided on the dashboard for alternatively coupling either the light 15 or the loudspeaker 25 to the microphone. By use of the loudspeaker 25, the bus driver can remind the students of the purpose of the light 15. Although the illustrated bus appears to be one of relatively small size, it will be understood that the loudspeaker 25 is primarily intended for relatively large buses.

Figure 2:
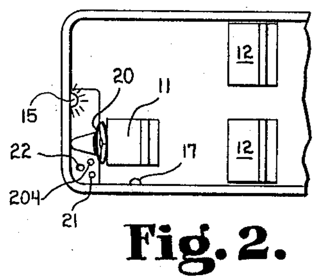
FIG. 2 is a plan view of the bus of FIG. 1 with the top removed to show the interior of the bus.
Figure 3:
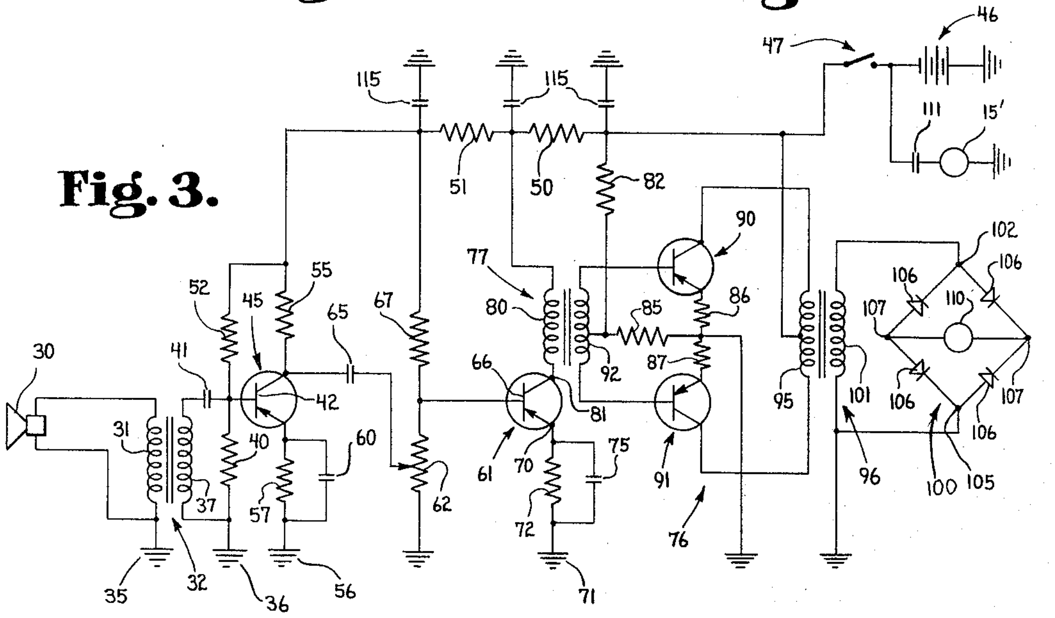
FIG. 3 is a schematic electrical circuit of one embodiment of the noise control system of the present invention.

Referring to FIG. 3, an alternative embodiment of the invention is illustrated, said alternative embodiment being similar to that illustrated in FIG. 1 and 2 with the exception that the loudspeaker 25 is not present. A microphone 30 is coupled to the primary 31 of a transformer 32, said transformer being grounded at 35 and 36. The secondary 37 of the transformer is coupled by an RC network including resistor 40 and capacitor 41 to the base 42 of a transistor 45.

The proper bias voltages are supplied to the transistor from a power supply 46 which may be the conventional battery of the bus. The negative voltage from the power supply passes through a simple on-off switch 47 and through resistors 50 and 51. The base voltage for the transistor 45 is provided through resistor 52 while the collector voltage is provided through resistor 55. The emitter of the transistor is coupled to ground at 56 through the resistor 57 and the capacitor 60 in parallel with the resistor 57. The output of the amplifier stage made up in part by the transistor 45 is coupled to a further amplifier stage including in part the transistor 61 through an RC coupling including the resistor 62 and the capacitor 65. The resistor 62 forms a part of a potentiometer which can be adjusted to vary the input from the transistor 45. The bias voltage to the base 66 of the transistor 61 is determined by the resistor 62 and a further resistor 67 coupled to the power supply through resistors 50 and 51. The emitter 70 of the transistor 61 is connected to ground at 71 through resistors 72 and parallel capacitor 75. The output of the amplifier stage made up in part by the transistor 61 is coupled to a push-pull amplifier stage 76 by means of a transformer 77. The primary 80 of the transformer is connected to the power supply 46 through the resistor 50 and has its other end connected to the collector 81 of the transistor 61.

The push-pull amplifier stage 76 is conventional in nature and will not be described in detail except to say that it includes the resistors 82, 85, 86, 87 and transistors 90 and 91, the secondary 92 of the transformer 77 and the primary 95 of the transformer 96. The output of the push-pull amplifier stage 76 is coupled across a rectifier bridge circuit 100 by the transformer 96, the secondary 101 of the transformer being connected to the bridge circuit at the points 102 and 105. The bridge circuit includes the four rectifiers 106 which permit flow of current in the direction indicated but prevent flow in the opposite direction. Coupled across the points 107 of the bridge circuit is a sensitive relay 110 having a pair of normally open contacts 111 which are closed when the relay 110 is actuated. The circuit further includes the light 15' which functions similarly to the above described light 15 and is positioned in the forward end of the school bus above eye level.

It should be mentioned that the input impedance is made very high for proper coupling to the microphone 30 by the transformer 32. The capacitors 115 make up a decoupling network to isolate the various stages of the amplifier and to protect against stray transient currents. Representative values of the various components might be as follows: Resistor 40—10K, resistor 52—100K, resistor 57—1K, resistor 55—4.7K, resistor 62—5K, resistor 67—25K, resistor 72—470 ohms, resistor 51—1K, resistor 50—220 ohms, resistor 82—2.7K, resistor 85—33 ohms, resistors 86 and 87—10 ohms, capacitors 41 and 65—10 microfarads at 15 v., capacitor 60—50 microfarads at 3 volts, capacitor 75—100 microfarads at 3 volts, capacitors 115—each 50 microfarads at 15 volts, transistors 45, 61, 90 and 91 might be 2N190, transformer 32—200K/1K, transformer 77—10K/2K CT, and transformer 96—500 CT/SR.

Of course, the above values are only provided to assist in construction of an embodiment of the invention and are merely representative.

The operation of the above circuit should be obvious from the explanation of its construction. It should be mentioned that the potentiometer 60 corresponds to the dial 22 on the dashboard of the bus and provides the means whereby the bus driver controls the level of intensity above which the light 15' is lit.

Figure 4:
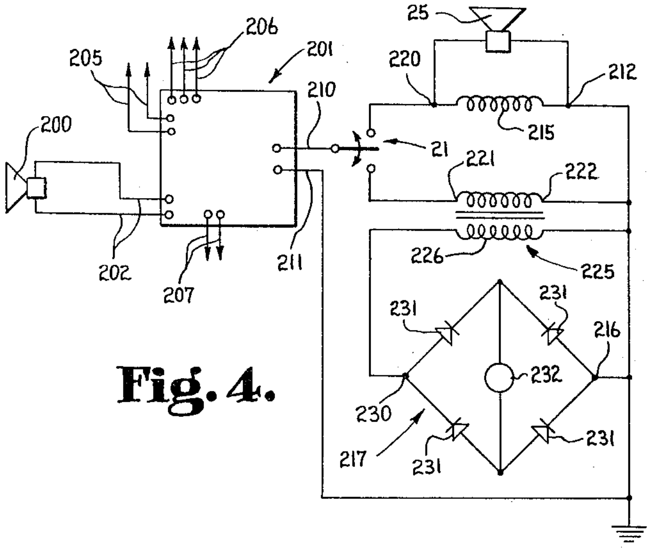
FIG. 4 is a schematic electrical diagram of the noise control system partially illustrated in FIGS. 1 and 2.

Referring to FIG. 4, the circuit of the arrangement of FIGS. 1 and 2 is illustrated as including a microphone 200 coupled to an amplifier 201 by wires 202. The wires 205 lead to an on-off switch 204 on the dashboard of the bus. The wires 206 correspond to the wiring adjacent the potentiometer 62 of the embodiment of FIG. 3 and lead to the volume control 22 on the dashboard of the bus. Wires 207 lead to the voltage supply for the device. The output of the amplifier 201 is fed into the wires 210 and 211. The wire 211 is connected to ground and is coupled to one side 212 of the voice coil 215 of the speaker 25. The wire 211 is also coupled to one side 216 of a bridge circuit 217. The wire 210 is alternatively coupled by the switch 21 to the other end 220 of the voice coil 215 or to the end 221 of the primary 222 of the transformer 225. A secondary 226 of the transformer 225 is connected to the point 230 opposite to the point 216 of the bridge 217.

Similarly to the bridge 100, the bridge 217 includes four rectifiers 231 so arranged that the alternating current placed across the bridge point 216 and 230 is converted into pulsating DC which passes through the relay 232 and controls the light 15 having a circuit (not shown) similar to the circuit of the light 15'.

It will be obvious from the above description that the present invention provides a device for indicating noise level in a school bus, said device also providing a game for the children while riding in the school bus. It will also be evident that the present invention provides a device which is usable to amplify the voice of the school bus driver as well as to amplify the noise within the bus to operate an indicator light.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention and the scope of the claims are also desired to be protected.

The invention claimed is:

1. In a passenger bus having a driver's seat and a plurality of passenger seats all facing forwardly, a noise level indicator system comprising a light mounted in the bus at the forward end thereof and sufficiently high to be visible to all persons sitting in said seats, a microphone mounted in said bus adjacent the top of said driver's seat whereby said mocrophone is adjacent the ear of a person sitting in said driver's seat, an amplifier coupled to said microphone, and means for adjusting the amplification of said amplifier to control the level of sound intensity which causes energization of said light, said light being coupled to said amplifier.

2. In a passenger bus having a driver's seat and a plurality of passenger seats all facing forwardly, a noise level indicator system comprising a light mounted in the bus at the forward end thereof and sufficiently high to be visible to all persons sitting in said seats, a microphone mounted in said bus adjacent the top of said driver's seat whereby said microphone is adjacent the ears and mouth of a person sitting in said driver's seat, a loudspeaker mounted within said bus, an amplifier coupled to said microphone, and means for alternatively coupling said light and said loudspeaker to said amplifier.

3. In a passenger bus having a driver's seat and a plurality of passenger seats all facing forwardly, a noise level indicator system comprising a light mounted in the bus at the forward end thereof and sufficiently high to be visible to all persons sitting in said seats, a microphone mounted in said bus adjacent the top of said driver's seat whereby said microphone is adjacent the ears and mouth of a person sitting in said driver's seat, a loudspeaker mounted within said bus, an amplifier coupled to said microphone, means for alternatively coupling said light and said loudspeaker to said amplifier, and means for adjusting the amplification of said amplifier to control the level of sound intensity which causes energization of said light.

4. In a passenger bus having a driver's seat and a plurality of passenger seats all facing forwardly, a noise level indicator system comprising a light mounted in the bus at the forward end thereof and sufficiently high to be visible to all persons sitting in said seats, a microphone mounted in said bus adjacent the top of said driver's seat whereby said microphone is adjacent the ears and mouth of a person sitting in said driver's seat, a loudspeaker mounted within said bus, an amplifier coupled to said microphone, means for adjusting the amplification of said amplifier, a relay arranged to actuate said light, a rectifier bridge, said relay being connected across said rectifier bridge, and means for alternatively coupling said bridge and said loudspeaker to said amplifier.

References Cited by the Examiner

UNITED STATES PATENTS 2,572,221 10/1951 Voigt ---------------- 179—1

OTHER REFERENCES

Kent, abstract of application Serial No. 270,083, published June 30, 1953, 671 O.G. 1501, 179–1.

KATHLEEN H. CLAFFY, *Primary Examiner.*

R. MURRAY, *Assistant Examiner.*